United States Patent
Shi et al.

(10) Patent No.: US 8,252,442 B2
(45) Date of Patent: Aug. 28, 2012

(54) BATTERY COVER LATCHING ASSEMBLY

(75) Inventors: Zheng Shi, Shenzhen (CN); Chih-Chiang Chang, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 828 days.

(21) Appl. No.: 12/401,717

(22) Filed: Mar. 11, 2009

(65) Prior Publication Data

US 2009/0246610 A1 Oct. 1, 2009

(30) Foreign Application Priority Data

Mar. 26, 2008 (CN) .......................... 2008 1 0300715

(51) Int. Cl.
*H01M 2/10* (2006.01)
(52) U.S. Cl. .............. 429/97; 429/96; 429/99; 429/100; 429/163; 429/175; 429/176
(58) Field of Classification Search .................... 429/96, 429/97, 100, 163, 175, 176; 361/747, 801, 361/679.01, 679.02, 679.58, 600; 292/292
See application file for complete search history.

(56) References Cited

U.S. PATENT DOCUMENTS

| | | | | |
|---|---|---|---|---|
| 5,007,859 | A | * | 4/1991 | Sangregory et al. .......... 439/500 |
| 2006/0175840 | A1 | * | 8/2006 | Wang et al. .................... 292/228 |
| 2007/0048599 | A1 | * | 3/2007 | Choi ................................ 429/97 |
| 2007/0218961 | A1 | * | 9/2007 | Luo et al. ................... 455/575.1 |
| 2007/0298318 | A1 | * | 12/2007 | Li .................................... 429/97 |

FOREIGN PATENT DOCUMENTS

| | | |
|---|---|---|
| CN | 2777910 Y | 5/2006 |
| CN | 200941403 Y | 8/2007 |

\* cited by examiner

*Primary Examiner* — Jennifer Michener
*Assistant Examiner* — Heng Chan
(74) *Attorney, Agent, or Firm* — Altis Law Group, Inc.

(57) ABSTRACT

A battery cover latching assembly, detachably securing a battery cover to a housing, includes a button, battery cover, elastic member arranged between the button and the housing, and a resisting member resisting the battery cover away from the housing. The button includes a locking portion. The battery cover includes a corresponding locking member. The locking portion is slidably received in the housing to clamp or release the locking member.

9 Claims, 6 Drawing Sheets

BATTERY COVER LATCHING ASSEMBLY

BACKGROUND

1. Field of the Disclosure

The present disclosure relates to battery housing and, particularly, to a battery cover latching assembly used in a portable electronic device.

2. Description of Related Art

Battery cover latching assemblies are usually provided to secure and allow required access to batteries to portable electronic devices.

A typical battery cover latching assembly for an electronic device usually includes a pair of hooks on one end of a battery cover of the electronic device and a locking pin on the other end of the battery cover. Correspondingly, a pair of grooves is defined in a housing of the electronic device. A locking hole corresponding to the locking pin is also defined in the housing. By attaching the battery cover onto the housing, the hooks can enter into the grooves, and the locking pin is securely latched into the locking hole. Thus, the battery cover is secured to the housing.

However, to detach the battery cover, considerable force is needed due to the tight latching of the locking pin into the locking hole. Thus, the battery cover may be damaged, and it is difficult to replace the locked battery.

Therefore, there is room for improvement within the art.

BRIEF DESCRIPTION OF THE DRAWINGS

Many aspects of the battery cover latching assembly can be better understood with reference to the following drawings. These drawings are not necessarily drawn to scale, the emphasis instead being placed upon clearly illustrating the principles of the present battery cover latching assembly. Moreover, in the drawings like reference numerals designate corresponding sections throughout the several views.

DETAILED DESCRIPTION OF EXEMPLARY EMBODIMENT

Figure 1:
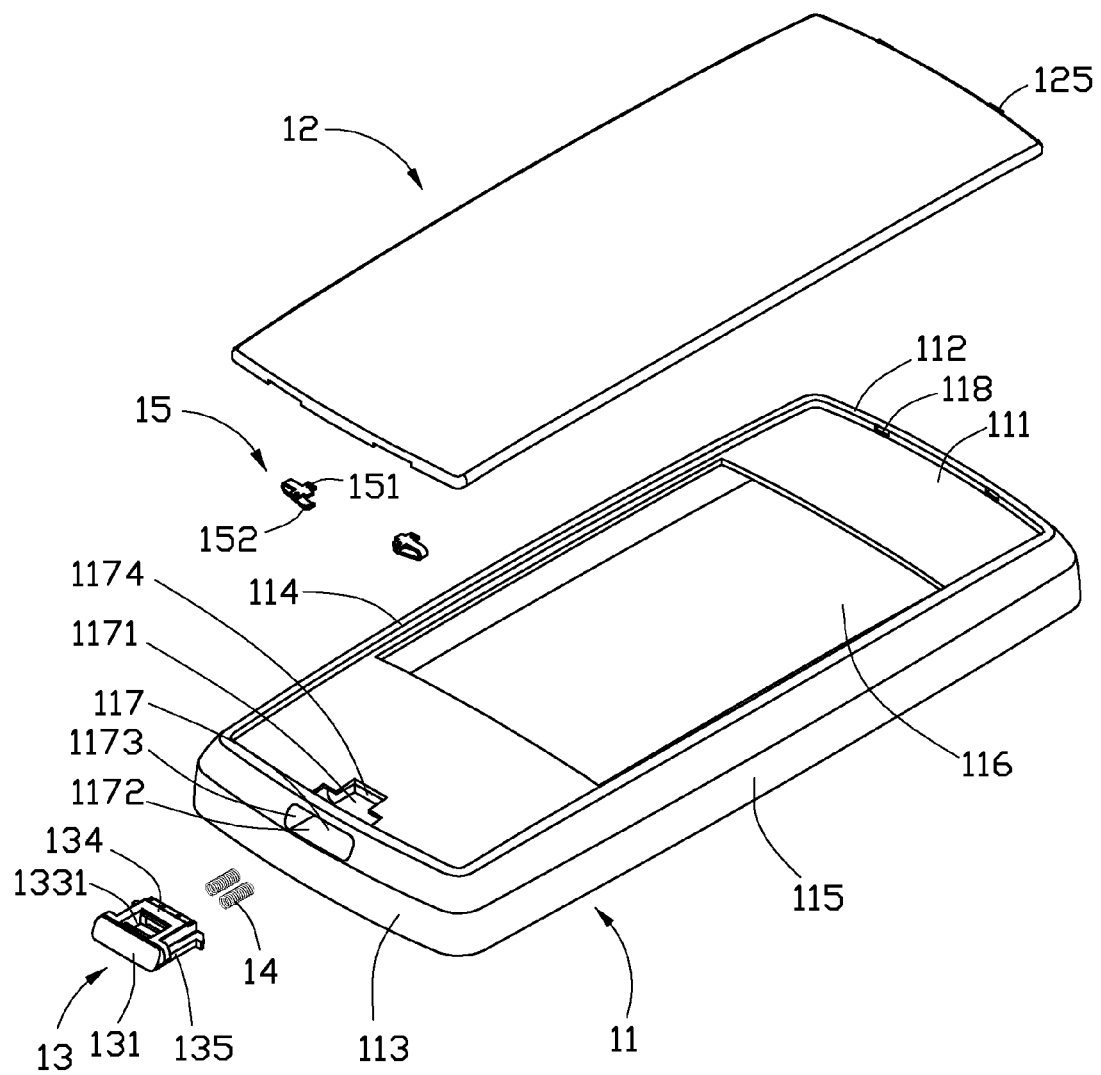
FIG. 1 is an exploded, isometric view of a battery cover latching assembly, in accordance with an exemplary embodiment.
Figure 2:
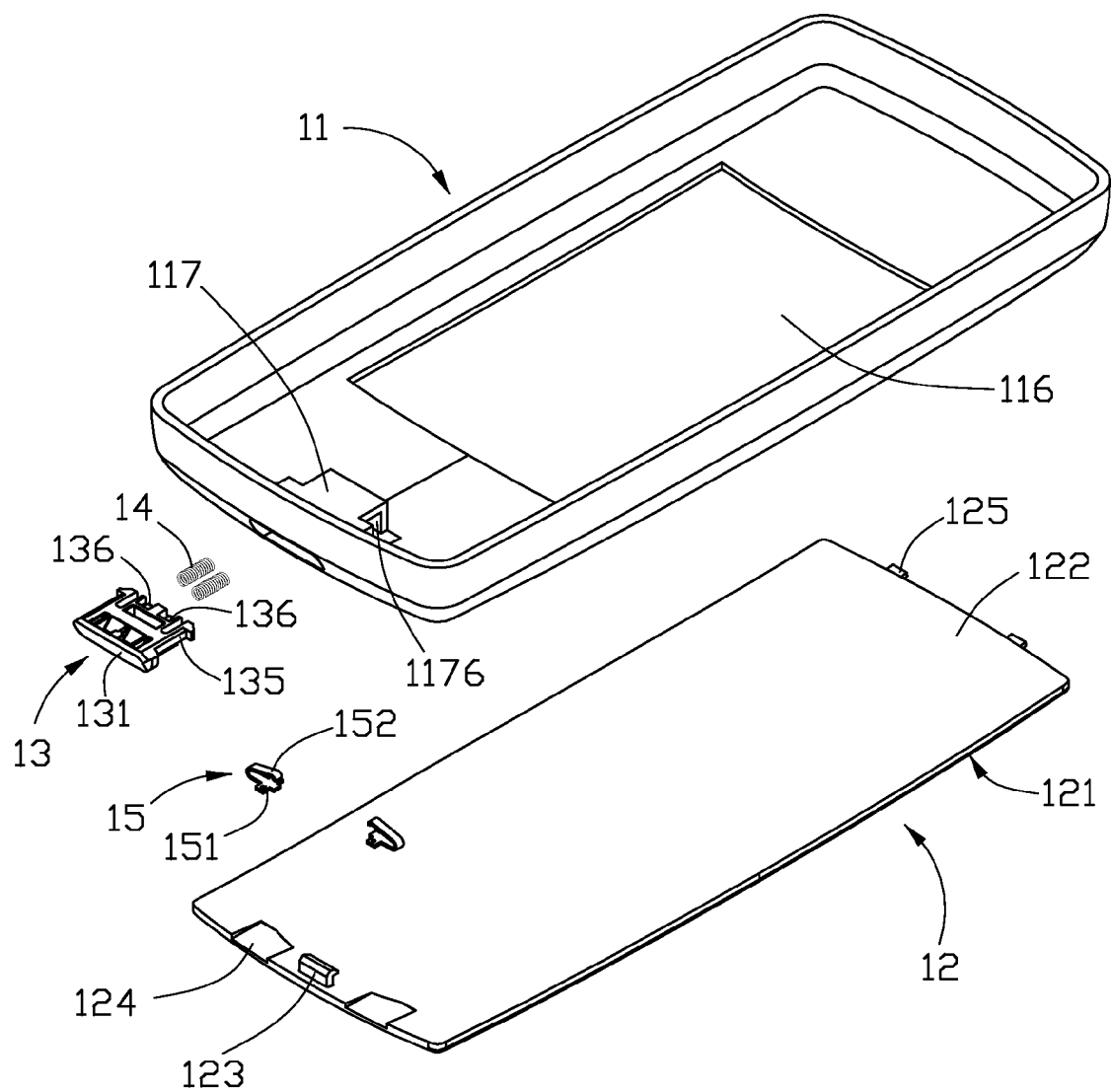
FIG. 2 is another exploded, isometric view of the battery cover latching assembly of FIG. 1.

FIGS. 1 and 2 show an exemplary battery cover latching assembly 10 used in portable electronic devices, such as mobile phone terminals, digital cameras, and others. The battery cover latching assembly 10 includes a housing 11, a battery cover 12, a button 13, two elastic members 14 and two resisting members 15.

The housing 11 includes a front wall 111, a top wall 112, a bottom wall 113, a left sidewall 114 and a right sidewall 115. The front wall 111, the top wall 112, the bottom wall 113, the left sidewall 114 and the right sidewall 115 cooperatively enclose a rectangular battery receiving space 116 seating a battery (not shown) therein. The housing 11 defines a button receiving compartment 117 and a T-shaped cutout 1171 in the front wall 111, and an opening 1172 through the bottom wall 113. The button receiving compartment 117 can be defined by two opposite sidewalls 1173 and a resisting wall 1174. Each sidewall 1173 defines a through hole 1176 (see FIG. 2). The top wall 112 defines two limiting grooves 118 adjacent to the front wall 111.

The battery cover 12 includes a front wall 121 and a back wall 122. A locking member 123 protrudes from an end of the back wall 122. The back wall 122 defines two securing portions 124 on two sides of the locking member 123. The resisting members 15 are fixed, by, for example, threading, to the corresponding securing portions 124. Two limiting blocks 125 correspond to the limiting grooves 118 and protrude outwardly from the periphery of the battery cover 12, opposite to the securing portions 124.

Figure 3:
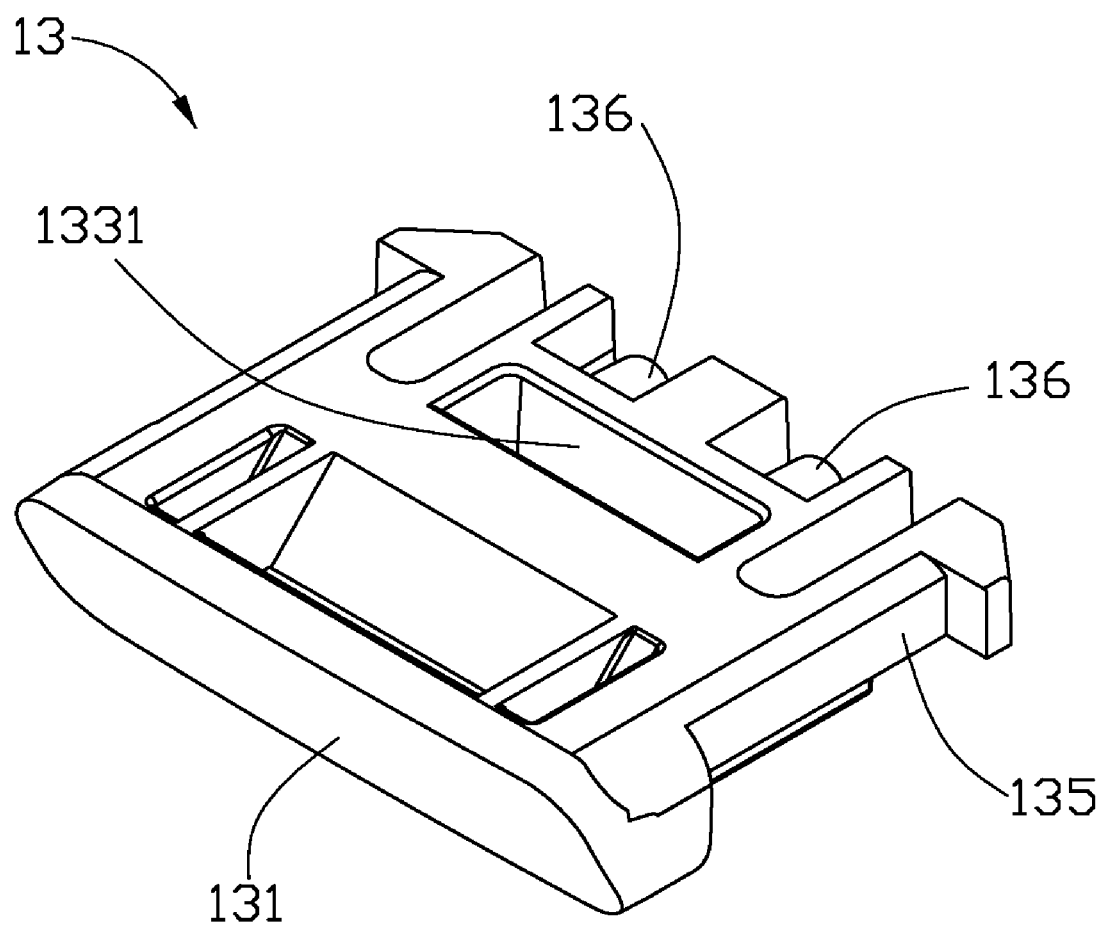
FIG. 3 is an enlarged, isometric view of the button shown in FIG. 2.

Referring to FIG. 3, the button 13 includes a contact surface 131. The button 13 defines a concave 1331 and thus forms a locking portion 134. The button 13 further includes two hooks 135 protruding away from the contact surface 131 on two sides of the locking portion 134. The hooks 135 elastically interlock in the through hole 1176. Two columns 136 are defined between the hooks 135 and adjacent to the locking portion 134, connecting to an inner surface of the contact surface 131.

Each elastic member 14 may be a coil spring, aligning and engaging the two columns 136 and received in the button receiving compartment 117. One end of each elastic member 14 abuts the resisting wall 1174, and the other end of the elastic member 14 abuts the button 13.

The resisting member 15 is a V-shaped elastic sheet including a first sheet portion 151 and a second sheet portion 152. A repelling force is generated when the angle between the first sheet portion 151 and the second sheet portion 152 is reduced. The first sheet portion 151 is fixed to the battery cover 12. The second sheet portion 152 faces the housing 11 and resists the battery cover 12 away from the housing 11.

Figure 4:
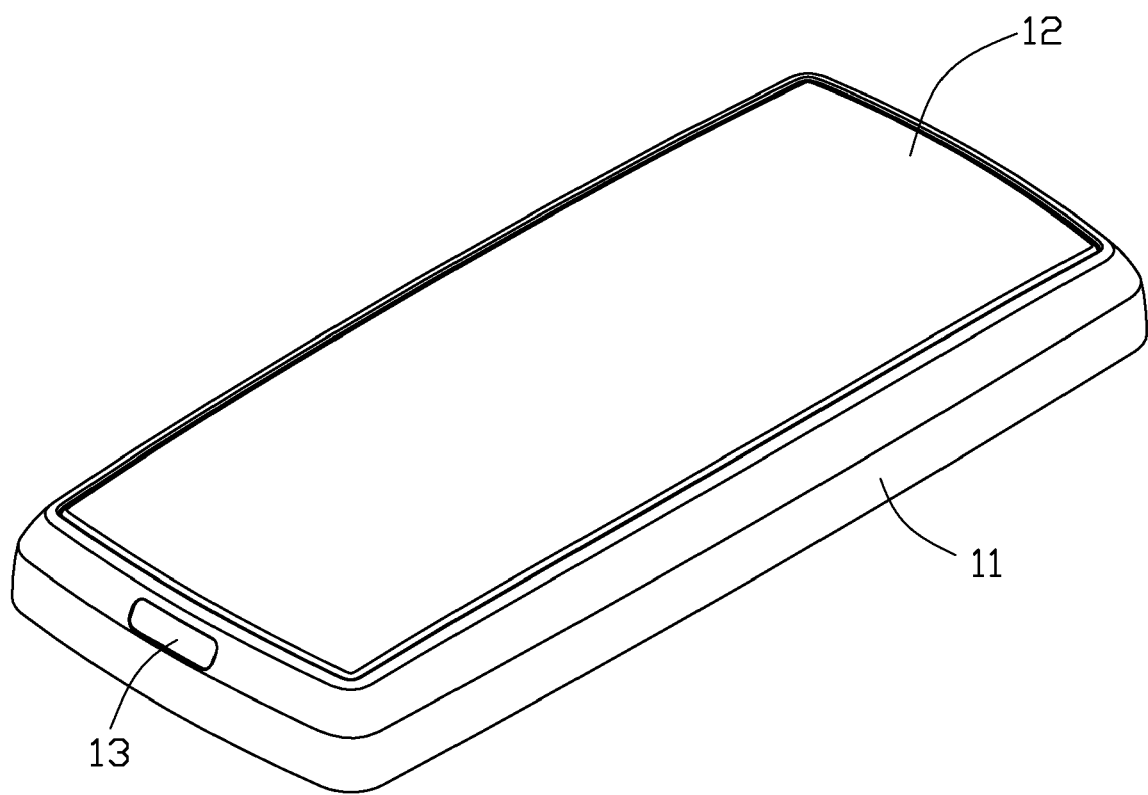
FIG. 4 is an assembled view of the battery cover latching assembly shown in FIG. 1.
Figure 5:
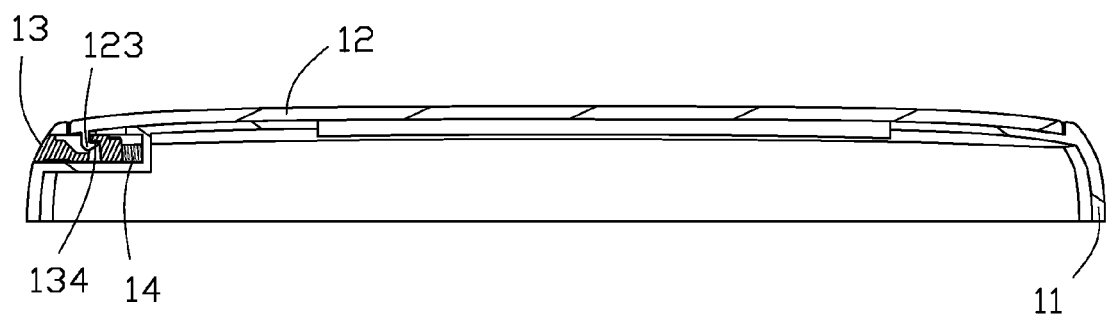
FIG. 5 is a cross-section of the battery cover latching assembly shown in FIG. 3.

Referring to FIGS. 4 and 5, during assembly, the elastic members 14 engage and wrap around the columns 136. The button 13 and the elastic members 14 are inserted into the button receiving compartment 117. The button 13 is further pressed to the resisting wall 1174 until the two hooks 135 interlock into the through hole 1176. At this time, the elastic members 14 are deformably compressed against the resisting wall 1174.

To latch the battery cover 12 to the housing 11, the battery cover 12 is aligned with and pressed downwardly to the housing 11. The limiting blocks 125 are inserted into the limiting grooves 118. The battery cover 12 is pivoted about the housing 11 until the locking member 123 is latched to the locking portion 134. At this time, the resisting members 15 are compressed between the battery cover 12 and the housing 11.

Figure 6:
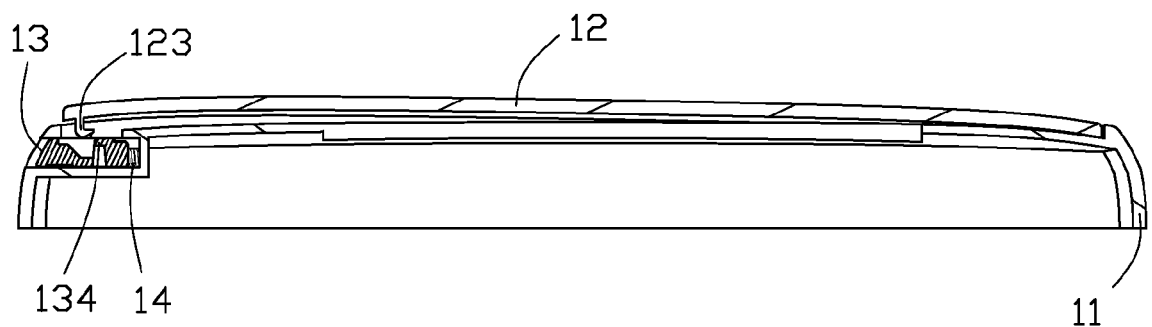
FIG. 6 is a cross-section of the battery cover latching assembly in a released position shown in FIG. 5.

Referring to FIG. 6, to release the battery cover 12, the button 13 is pressed towards the resisting wall 1174 to release the locking member 123 from the locking portion 134. The battery cover 12 then automatically releases upwardly from the housing 11 by the decompression of the resisting members 15.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A battery cover latching assembly detachably securing a battery cover to a housing, the housing defining a button receiving compartment and two through holes communicating with the button receiving compartment, the battery cover latching assembly comprising:

a button including a concave forming a locking portion, the battery cover including a corresponding locking member, the button further including two elastic hooks protruding on two opposite sides of the locking portion, the two elastic hooks slidably received and locked in the through holes;

an elastic member arranged between the button and the housing, the locking portion being slidably received in the button receiving compartment of the housing; and a resisting member arranged between the battery cover and the housing and being used to resist the battery cover away from the housing.

2. The battery cover latching assembly as claimed in claim 1, wherein the resisting member is an elastic sheet, including a first sheet portion and a second sheet portion, wherein a repelling force is generated when the angle between the first sheet portion and the second sheet portion is altered, and wherein the first sheet portion is fixed to the battery cover and the second sheet portion faces the housing and resists the battery cover.

3. The battery cover latching assembly as claimed in claim 2, wherein the resisting member is a V-shaped elastic sheet.

4. The battery cover latching assembly as claimed in claim 1, wherein the housing includes a front wall, a top wall, a bottom wall, a left sidewall and a right sidewall, and the front wall, the top wall, the bottom wall, the left sidewall and the right sidewall cooperatively enclose a battery receiving space.

5. The battery cover latching assembly as claimed in claim 1, wherein the button receiving compartment is defined by two opposite sidewalls and a resisting wall, the two sidewalls and the resisting wall cooperatively enclosing a button receiving compartment.

6. The battery cover latching assembly as claimed in claim 5, wherein each sidewall defines a through hole.

7. The battery cover latching assembly as claimed in claim 1, wherein the button includes a contact surface from which the two elastic hooks protrude on two sides of the locking portion, the two elastic hooks interlocking in the through holes.

8. The battery cover latching assembly as claimed in claim 7, wherein a column protrudes from the button adjacent to the hooks, with which the elastic member aligns and engages.

9. The battery cover latching assembly as claimed in claim 1, wherein the housing defines a limiting groove, into which a corresponding limiting block protruding from the battery cover is inserted.

* * * * *